June 5, 1962
E. AZARI ET AL
3,037,625
CARD PROCESSING SYSTEM
Filed Aug. 4, 1958
6 Sheets-Sheet 2
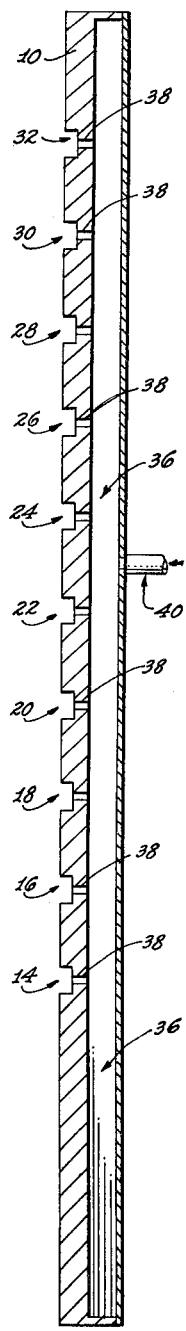
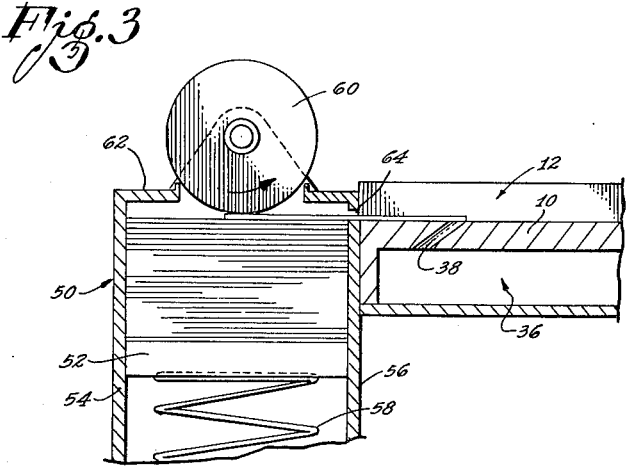
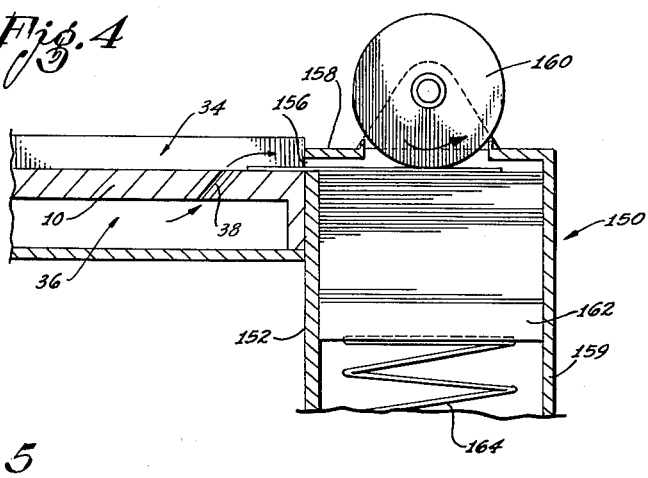
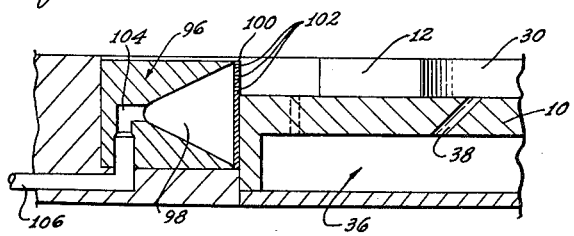
INVENTORS:
Eric Azari
Eugene W. Greenstadt
Jerome B. Wiener
Smyth & Roston
Attorneys

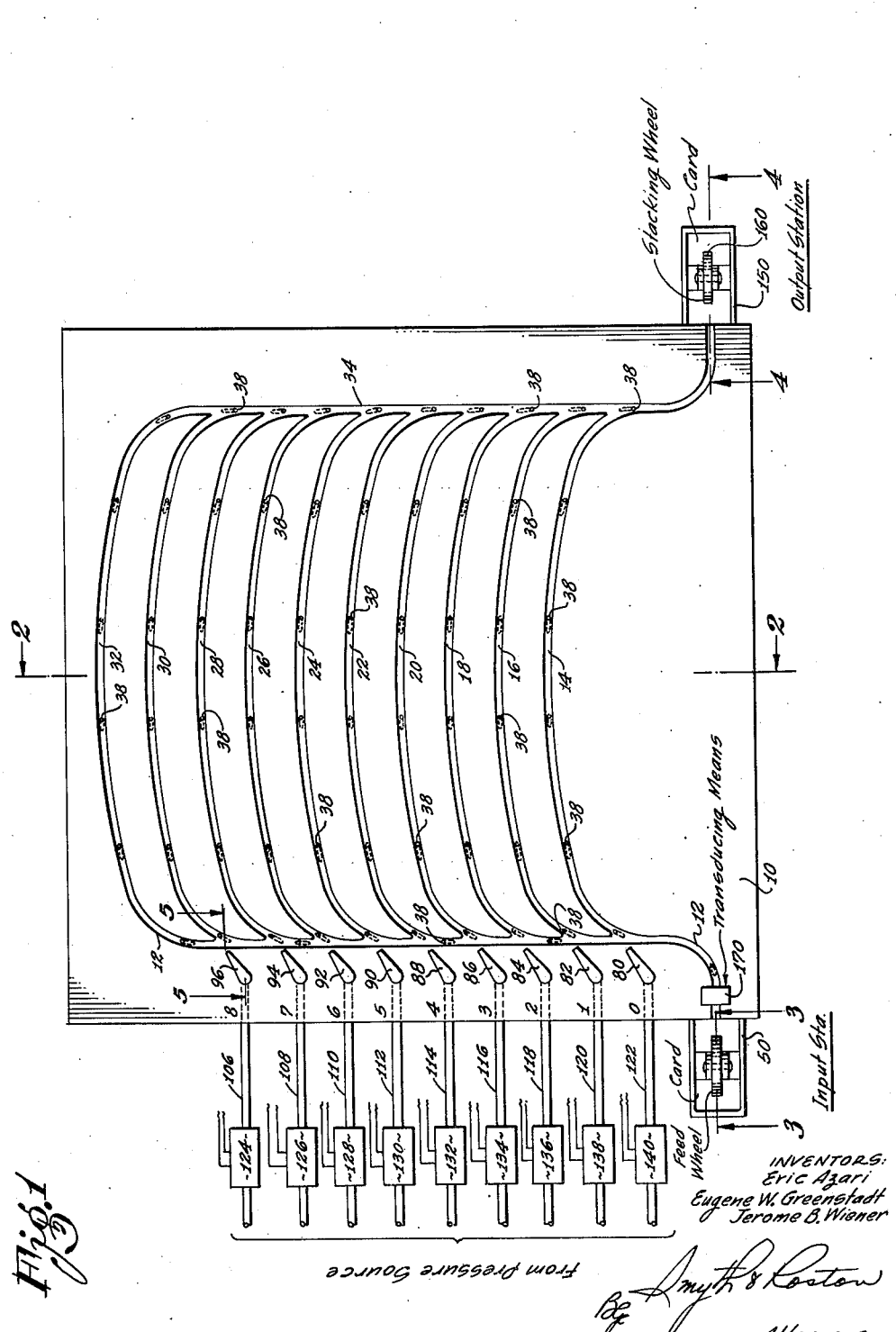

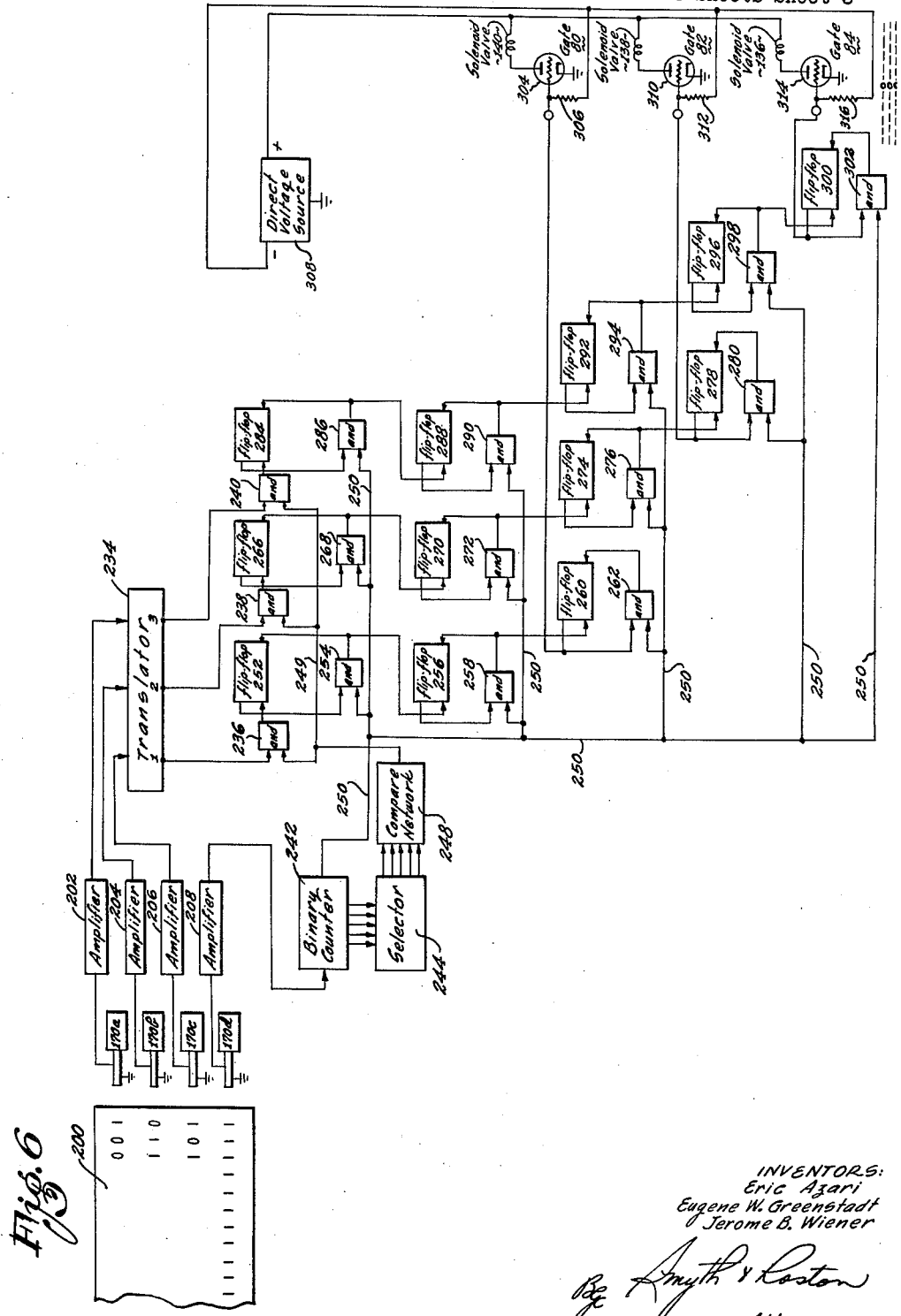

June 5, 1962

E. AZARI ET AL 3,037,625

CARD PROCESSING SYSTEM

Filed Aug. 4, 1958

INVENTORS
Eric Azari
Eugene W. Greenstadt
Jerome B. Wiener

By Smyth & Roston
Attorneys

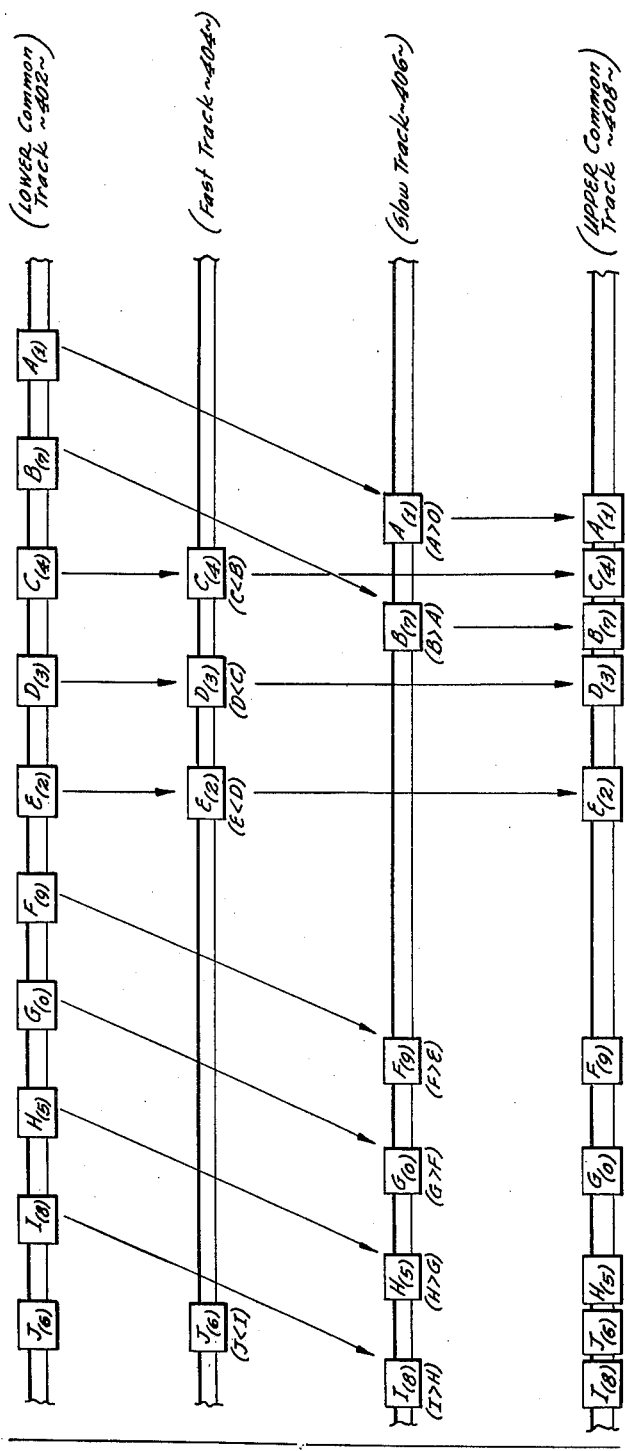

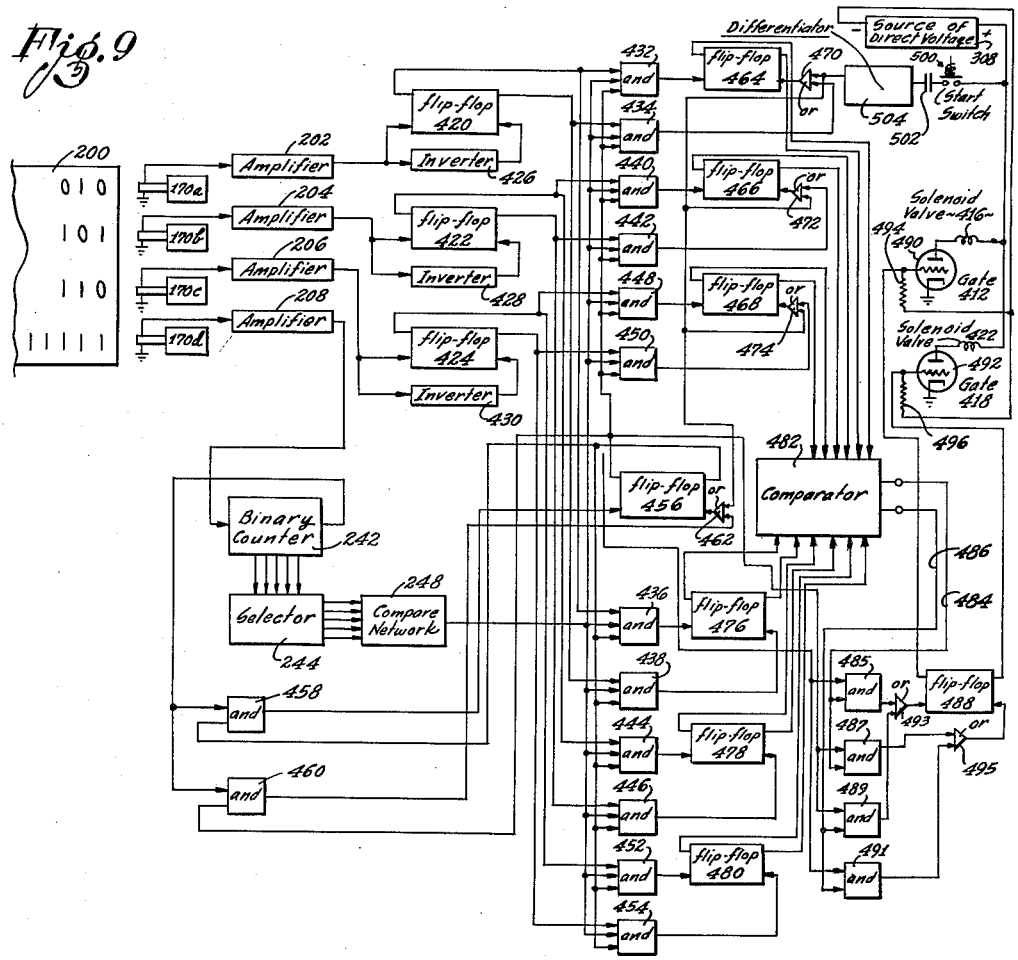

3,037,625
CARD PROCESSING SYSTEM
Eric Azari, Pacific Palisades, Jerome B. Wiener, Granada Hills, and Eugene W. Greenstadt, Santa Monica, Calif., assignors to Magnavox Company, Los Angeles, Calif., a corporation of Delaware
Filed Aug. 4, 1958, Ser. No. 752,935
18 Claims. (Cl. 209—72)

This invention relates to apparatus for handling and processing discrete elements such as information storage cards, and it relates more particularly to such apparatus which includes an improved card transport medium and associated components which enable the medium to perform sorting operations on the cards as they are transported from one station to another.

In one general type of data processing system, the data stored in the system is recorded on a plurality of individual information storage cards. The information may be written on the cards in the form of patterns of holes, in rows of magnetic areas of one polarity or another, as black and white markings, or in any other suitable form.

It is usual for the data to be stored on the cards in binary form, with the symbols being arranged in a series of rows and columns. Each column, for example, represents a different position on each card, and the pattern of symbols at that position represent the various binary digits of a multi-digit number. Certain of the numbers themselves may identify the cards, and serve as symbols in a selected progression into which the cards are to be sorted. It will be understood that this sorting may be in accordance with the symbol at any selected position on each of the cards.

Suitable transducers are provided for reading the information on the cards or for writing new information on them. When hole patterns are used, for example, the transducers may be mechanical, optical or electrical, so that the presence or absence of a hole can be sensed for any particular area of each card to provide a binary designation. When magnetic recordings are used, on the other hand, electromagnetic transducers are provided for processing the cards. Electro-optical transducers are used for sensing the different areas when, for example, black and white areas are used as binary recordings for the data.

A variety of types of systems and apparatus have been proposed for handling the information storage cards and for transporting the cards past appropriate transducers for processing. A most successful type of apparatus utilizes rotatable vacuum pressure transport drums. Such apparatus may be used for selectively merging, sorting, collating or for otherwise handling the information storage cards.

In the apparatus utilizing the rotatable vacuum pressure drums, the cards are selectively fed to the periphery of a transport drum from a card holding station positioned to have its mouth disposed adjacent the peripheral surface of the drum. A vacuum pressure is provided at the periphery of the drum and the drum is rotated. The cards fed from the card holding station to the peripheral surface of the drum are transferred in succession to the drum from the card holding station, the cards being securely held at spaced positions around the peripheral surface of the drum.

The vacuum pressure drum in the prior art systems is used either alone or in conjunction with similar drums to carry the cards in succession past a plurality of transducers at a reading or writing station for processing the cards. This processing, for example, may establish certain sorting controls, and the cards may be selectively transferred to other vacuum transporting drums under the action of these controls. The other drums may then carry the cards to different card holding stations into which the cards are deposited.

Copending application Serial No. 731,413 filed April 28, 1958, by Eric Azari, now Patent No. 2,981,411 provides a different type of transport medium for the cards. The transport medium of the copending case includes a stationary guide surface for transporting the information storage cards, with a series of pressurized fluid streams (such as air) being directed at an angle through orifices in the surface at spaced intervals along the path in which the cards are to be transported. The pressurized fluid streams emitted by the orifices set up a Bernoulli effect between the cards and the guide surface, and this effect causes the cards to be transported rapidly along the surface and at the same time to be firmly retained on the surface on a cushion of the pressurized fluid. The structure of the transport medium of the copending application can be used efficiently to transport cards from one card holding station to another, as described in detail in that case.

The present invention utilizes a transport medium similar to that described in the copending application. However, the transport medium of the present invention provides a plurality of different paths for the cards from one station to another. These paths are constructed to have different lengths or to carry the cards at different speeds, so that the cards arrive at the receiving station in an order different from that with which they left the input station.

In accordance with the invention, control means is provided for reading data on the cards to develop control signals which control gating means. The gating means in turn direct the cards to different paths of the transport medium as determined by the different symbols represented by the data on the different cards. Therefore, the cards can be made to arrive at the receiving station in a sorted condition with respect to the data recorded on them.

Although the invention will be described in conjunction with information storage cards bearing binary data, it will become evident as the description proceeds, that any suitable type of coding of any desired radix can be used; and also that the invention can be used in conjunction with individual elements other than cards.

It is accordingly a general object of the present invention to provide a simple, rugged and straightforward apparatus and system for sorting the information storage cards in accordance with certain data recorded on the cards. For example, the data at a selected position on the cards may represent in binary form different decimal numbers in a selected progression. The apparatus of the invention is capable of responding to the binary data at the selected position of each card to cause the cards to arrive at the receiving station in a sorted condition with respect to the different numbers of the numeric progression. A feature of the invention is that the sorting of the cards is performed without the need for mechanically moving parts, or without the necessity of shifting the cards between different transport mediums and stations.

Other features and advantages of the invention will become evident from the following description. This description, and the following drawings are intended to represent certain illustrative examples of the invention.

In the drawings:

FIGURE 1 is a top plan view of one embodiment of the invention in which the cards are transported from an input station over a plurality of different paths on the guiding surface of a stationary transport medium, each of the paths being constructed to have a different length, so that the cards may arrive at a receiving station in an order different from that with which they left the input station;

FIGURE 2 is a sectional view substantially on the line 2—2 of FIGURE 1, the latter view showing the manner in which pressurized fluid is introduced to the surface of the transport medium of FIGURE 1 to provide individual streams along the different paths of the transport medium to create a Bernoulli effect and retain the cards in the different paths and to move them rapidly along the paths;

FIGURE 3 is a sectional view substantially on the line 3—3 of FIGURE 1 to show the details of the input station in which the cards are held in a stacked unsorted condition, this view showing a feed wheel which moves the cards in succession through a mouth at the top of the input station and on to the transport medium;

FIGURE 4 is a sectional view substantially on the line 4—4 of FIGURE 1, this latter view showing the details of the output station, and which station is similar to the input station of FIGURE 3 with the exception that the associated feed wheel moves in a direction to draw cards through the mouth of the output station and into the output station;

FIGURE 5 is a sectional view substantially on the line 5—5 of FIGURE 1 to show the details of one of a plurality of pneumatic gate members which are used selectively to direct the cards to the different paths of the transport medium of FIGURE 1;

FIGURE 6 is a block diagram of a suitable logic control system for controlling the gates of the apparatus of FIGURE 1 in accordance with data recorded on the cards so that the cards may be directed to the different paths in accordance with a desired sorting procedure;

FIGURE 8 is a schematic representation of the disposition of cards on the transport medium of FIGURE 7 and which is helpful in explaining the operation of that embodiment of the invention; and FIGURE 9 is a block diagram of a suitable logic control system for the second embodiment of the invention.

Figure 7:
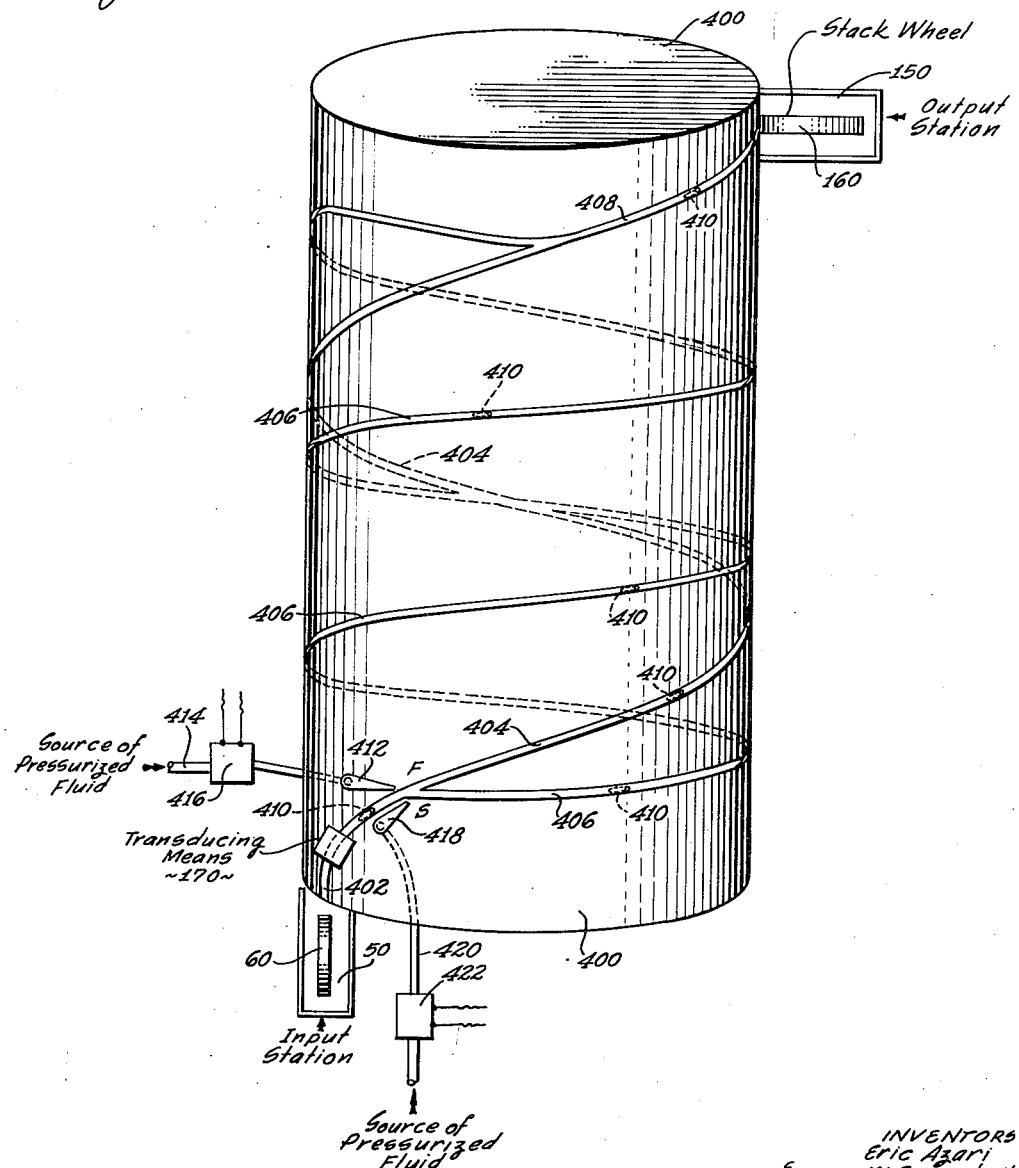
FIGURE 7 is a view of a second embodiment of the invention in which the transport medium has a cylindrical configuration, with helical paths for the cards spiraling around the surface of the transport medium.

The apparatus of FIGURES 1-5 includes a table top 10. A first common groove 12 is formed in the table top, and this groove has an entrance at the lower right hand corner of the table top and extends to the right in FIGURE 1 for a short distance and then up the left hand side of the table top towards the top of FIGURE 1. This groove, and other grooves to be described, may have a width corresponding to the width of the cards to be transported by the apparatus. Alternatively, these grooves may be thin so that the cards are transported on the top surface of the table top itself, or the grooves may be dispensed with, as will become apparent.

Branching off from the common groove 12 are a series of similar grooves 14, 16, 18, 20, 22, 24, 26, 28, 30 and 32. These latter grooves extend from the common groove 12 across the table top 10 to the right in FIGURE 1, and they terminate in a second common groove 34. The common groove 34 extends down the right hand edge of the table top and terminates in the lower right hand corner.

As best shown in FIGURE 2, the under side of the table top 10 is formed into a chamber 36 which extends under the entire table top. This chamber 36 has a plurality of orifices 38 extending from it into the various grooves, including the common channel 12 and the common channel 34, and the interconnecting channels 14, 16, 18, 20, 22, 24, 26, 28, 30 and 32. The orifices 38 extend through the table top 10 at an angle inclined to the right in FIGURE 1. A line 40 extends from the chamber 36 to a source of pressurized fluid such as air under pressure. The pressurized fluid is forced into the chamber 36 and out the various orifices 38 into the different channels. The air in the channels has a major vector extending upwardly through the channel 12, to the right through the channels 14, 16, 18, 20, 22, 24, 26, 28, 30 and 32, and downwardly in the common channel 34. The resulting pressurized fluid emerging from the orifices causes the cards to be rapidly moved along the channels in the direction of the vectors in the different grooves and, by the Bernoulli effect, to cause the cards to be securely maintained on the guiding surface of the table top 10.

An input station 50 is mounted adjacent the table top 10 at the lower left hand corner of the table top, and with the mouth of the station adjacent the entrance mouth of the channel 12. The input station 50 is adapted to hold the information cards in a stacked condition, as shown in FIGURE 3. The station includes a pusher member 52 which is biased upwardly between a pair of vertical side walls 54 and 56 by means of a spring 58. The cards are supported in a horizontal position on top of the pusher member 52, and the spring 58 causes the pusher to urge the cards towards the top of the station.

A rotatable feed wheel 60 is mounted at the top of the station 50 in FIGURE 3, and the feed wheel extends through a cover 62 of the station. The cover 62 defines a throat 64 with the side wall 56, and this throat is aligned with the mouth of the channel 12. The feed wheel 60 is rotated so that it moves a card at a time through the throat 64 and into the channel 12 until the card may come under the influence of the pressurized fluid emerging from the adjacent orifice 38 to be carried rapidly through the channel. The above assembly merely exemplifies one of the many typical means for feeding cards from the station to the channel 12.

A plurality of switching or gate transfer members 80, 82, 84, 86, 88, 90, 92, 94 and 96 are supported in the table top 10 to be adjacent the branch points of the common channel 12 and the channels 14, 16, 18, 20, 22, 24, 26, 28, 30 and 32. These gate members are of the pressurized fluid emitting type and may all be similar to the member 96 which is shown in section in FIGURE 5.

As illustrated in FIIGURE 1, each of the gate members (such as the member 96) has a tear-drop configuration when viewed in plan, and, as shown in FIGURE 5, each has a bell-shaped internal chamber 98. This chamber has a thin apertured strip 100 secured to its large forward end, and the strip 100 has a plurality of apertures 102 through which pressurized streams of fluid may emerge. The throat of the bell-shaped chamber 98 communicates with a conduit 104 which is coupled to a line 106. When pressurized fluid, such as air, is introduced through the line 106 and through the conduit 104 to the chamber 98, pressurized streams are caused to emerge from the apertures 102. These streams in effect form a barrier, so that any card coming to the junction of the channels 12 and 30, for example, and when the pneumatic gate member 96 is activated, is caused to shift to the right and into the channel 30, rather than proceeding up in the channel 12. In like manner, the activation of the gate 94 causes the cards to be moved from the channel 12 into the channel 28, and the activation of the other gate members causes the cards to be moved from the common channel 12 into the corresponding ones of the channels 14, 16, 18, 20, 22, 24 and 26.

A plurality of lines 106, 108, 110, 112, 114, 116, 118, 120 and 122 extend to respective ones of the pneumatic gate members 96, 94, 92, 90, 88, 86, 84, 82 and 80. A corresponding plurality of solenoid actuated valves 124, 126, 128, 130, 132, 134, 136, 138 and 140 are disposed in respective ones of the lines 106, 108, 110, 112, 114, 116, 118, 120 and 122. These lines each extend to a suitable source of pressurized fluid such as air. Whenever a corresponding one of the solenoid valves is energized, the pressurized fluid from the source is introduced to the corresponding gate transfer member. This causes the gate transfer member to emit streams of pressurized fluid to cause any card coming under their influence to be transferred from the common channel 12 into one of the cross channels. When the gate members are not activated in this manner, however, the cards travel up the common channel 12 and across the guiding surface of the transport medium 10 in the channel 32. All the cards are carried by the cross channels into the common channel 34.

An output station 150, which is shown in FIGURE 4, is mounted adjacent the table top 10 and at the mouth of the common channel 34. The output station 150 is similar to the input station 50 and it too includes a pair of side walls 152 and 154. The cards from the channel 34 are introduced into the output station through a throat 156 between its cover 158 and its side wall 152. A stack wheel 160 rotatable in a counterclockwise direction serves to draw the cards into the station so that they may be stacked horizontally over a pusher member 162. A spring 164 biases the pusher member upwardly so that the cards in the output station may be maintained in a stacked relation.

Therefore, as cards are fed from the input station 50, to the mouth of the channel 12, such cards are rapidly transported by the Bernoulli effects created by the fluid pressure in that channel along the channel. A transducing means 170 is mounted in any appropriate manner over the table top 10 in coupled relationship with the cards as they are transported under it by the pressure in the channel 12. This transducing means may include a plurality of transducer heads, which, in a manner to be described, process different rows of data on each card as the cards are transported past it.

The resulting control signals derived from the transducing means 170 are used to control the solenoid valves 124, 126, 128, 130, 132, 134, 136, 138 and 140 which, in turn, control the activation of the gate members 96, 94, 92, 90, 88, 86, 84, 82 and 80. Therefore, as determined by identifying data on the individual cards, the different cards are transported to the output station 150 over different ones of the paths 14, 16, 18, 20, 22, 24, 26, 28, 30 and 32. Each of these paths requires a different time interval to transport the cards from the input station to the output station. Therefore, the cards can arrive at the output station in an order different from which they were fed to the transport medium from the input station. The control of the solenoid valves and the activation of the gate members may be such that the cards are sorted in accordance with any desired sorting sequence.

For example, a particular position on the cards may represent different numbers or other symbols in a selected progression, and the control system associated with the apparatus responds to the binary data representing the symbols so that the cards are directed to the different paths of the transport medium to arrive at the output station 150 in a desired sorted sequence.

For purposes of description, ten different paths are shown in FIGURE 1 between the input station and the output station. It will be assumed that the binary data at a selected position on the cards represent numbers from zero to nine for different ones of the cards. The apparatus shown in FIGURES 1-5 is capable of responding to this binary data so that the cards arrive at the output station in a decimal sorted condition with respect to the numbers 0-9. It will be appreciated that by appropriate timing, any number of information cards can be sorted with respect to the numbers 0-9 upon their travel from the input station to the output station.

The logic control system for the apparatus of FIGURE 1 is shown in FIGURE 6, the illustrated system representing one possible control for providing the desired sorting operation.

In FIGURE 6, one of the cards transported by the system is illustrated, and this card is designated as 200. The information is recorded on the cards in rows and columns and in binary form. The binary data in each column represents a multi-digit binary number whose decimal equivalent, for example, may represent the position in a numerical sequence of from 0-9 into which the particular card is to be sorted.

The transducing means 170 is shown in FIGURE 6 as a plurality of electromagnetic transducer read heads 170a, 170b, 170c and 170d. Each of these heads reads a different row of data on the card 200. The heads 170a, 170b and 170c read information rows, and the head 170d reads a clock row. The clock row includes a series of magnetic recordings, each corresponding to a binary 1, and each representing a different position or column on the card. Each column then contains three separate binary digits. This is shown for purposes of convenience, and in most applications more digits would be used which, of course, would require more read heads.

The heads 170a, 170b, 170c and 170d are respectively connected to a plurality of amplifiers 202, 204, 206 and 208. The respective output terminals of the amplifiers 202, 204 and 206 are connected to a translator 234 which is shown in block form. The translator provides a decoding of binary numbers into corresponding decimal values. Such a translation may be obtained by a biquinary decoding network or other suitable decoding network or matrix system. Such networks are well known to the art. It should be appreciated that any translator for decoding numbers of one matrix into numbers of another, or for changing any information from one form to another may be used.

The translator 234 has a plurality of output terminals. For example, when a binary pattern of signal indications is translated into a decimal pattern, the translator will have ten output terminals each representing a different number from zero to nine and each operating a different one of the solenoid valves 124, 126, 128, 130, 132, 134, 136, 138 and 140 of FIGURE 1.

In a practical embodiment of the invention, the cards 200 would have sufficient rows in addition to the bottom clock row so that each column may represent decimal numbers of from zero to nine, these rows being scanned by a corresponding plurality of transducer heads such as the heads 170a, 170b and 170c. Then, the amplifiers 202, 204 and 206 would be extended in number to correspond to the number of such rows and to supply the necessary input signals to the translator 234 to permit the translator to provide a decoding sequence of from zero to nine for each column which, in turn, corresponds to each position of the card. However, to simplify the description, only three rows of information are shown on the card 200 and only three amplifiers 202, 204 and 206 are shown, and the translator 234 is illustrated as providing decimal equivalents of from one to three.

The number 1 output terminal of the translator 234 is connected to one of the input terminals of an "and" network 236. The number 2 output terminal of the translator is connected to an input terminal of an "and" network 238, and the number 3 output terminal of the translator is connected to an input terminal of an "and" network 240.

The "and" networks are well known to the electronic digital computer art. These networks include transistors or diodes which are connected so that a signal is passed to the output terminal of the network only upon the simultaneous application of input signals to all of the input terminals of the network.

The amplifier 208 is connected to a binary counter 242. A selector network 244 is connected to the individual stages of the binary counter, and the selector is connected to a compare network 248. The selector 244 includes a plurality of manually operable switches which may be individually set to any of two positions. When the triggered pattern of the stages of the binary counter 242 corresponds to the setting of the switches in the selector 244, output signals are introduced to all the input terminals of the compare network 248. The compare network 248 is similar to an "and" network, and it develops an output pulse at its output terminal and on the lead 249 when this condition occurs.

The compare network 248 therefore provides an output pulse for a given number of input pulses to the binary counter 242 for any particular count of the clock recordings on the card being processed, as determined by the setting of the selector 244. The binary counter itself develops an output pulse on the lead 250 corresponding to the full count of the clock recordings, which corresponds to the end of the card being processed by the transducer heads 170a, 170b, 170c and 170d.

Therefore, as the head 170d scans the row of clock recordings on the card 200, a pulse is introduced to the binary counter 242 for each successive position of the card 200 as it is processed by the transducers. These pulses are counted by the binary counter 242 until the selected position of each card is reached. At that time, the pattern of the stages in the binary counter corresponds to the established pattern of the switches in the selector 244 so that the compare network 248 is able to develop an output signal which is introduced to the "and" networks 236, 238 and 240. At the termination of processing of each card, the binary counter 242 develops an output signal on the lead 250.

The "and" network 236 is connected to the left input terminal of a flip-flop 252. The lead 250 from the binary counter 242 is connected to an input terminal of an "and" network 254, and the left output terminal of the flip-flop 252 is also connected to an input terminal of this "and" network. The output terminal of the "and" network 254 is connected to the right input terminal of the flip-flop 252, and this output terminal is also connected to the left input terminal of a flip-flop 256.

Flip-flops such as those referred to above are also well known to the electronic digital computer art. These flip-flops are bi-stable relaxation oscillators and are triggered to a true state, for example, by a negative signal introduced to the left input terminal, and they may be triggered to a false state, for example, by a negative signal introduced to the right input terminal. A relatively high voltage appears at the left output terminal of the flip-flop when it is in its true state, and a relatively high voltage appears at the right output terminal when the flip-flop is in its false state.

The left output terminal of the flip-flop 256 is connected to an input terminal of an "and" network 258, and the lead 250 from the binary counter 242 is connected to a second input terminal of this "and" network. The output terminal of the "and" network 258 is connected to the right input terminal of the flip-flop 256 and to the left input terminal of a flip-flop 260. The left output terminal of the flip-flop 260 is connected to an input terminal of an "and" network 262, and the lead 250 from the binary counter 242 is connected to a second input terminal of this "and" network. The output terminal of the "and" network 262 is connected to the right input terminal of the flip-flop 260.

The output terminal of the "and" network 238 is connected to the left input terminal of a flip-flop 266. The left output terminal of the flip-flop 266 is connected to the input terminal of an "and" network 268. The lead 250 from the binary counter 242 is connected to a second input terminal of this "and" network, and the output terminal of the "and" network 268 is connected to the left input terminal of a flip-flop 270 and to the right input terminal of the flip-flop 266. The left output terminal of the flip-flop 270 is connected to an input terminal of an "and" network 272, and the lead 250 from the binary counter 242 is connected to a second input terminal of this "and" network.

The output terminal of the "and" network 272 is connected to the right input terminal of the flip-flop 270 and to the left input terminal of a flip-flop 274. The left output terminal of the flip-flop 274 is connected to one of the input terminals of an "and" network 276. The lead 250 from the binary counter 242 is connected to a second input terminal of this latter "and" network 276.

The output terminal of the "and" network 276 is connected to the right input terminal of the flip-flop 274 and to the left input terminal of a flip-flop 278. The left output terminal of the flip-flop 278 is connected to one of the input terminals of an "and" network 280. The lead 250 from the binary counter 242 is connected to a second input terminal of the "and" network 280, and the output terminal of this "and" network is connected to the right input terminal of the flip-flop 278.

The output terminal of the "and" network 240 is connected to the left input terminal of a flip-flop 284. The left output terminal of the flip-flop 284 is connected to one of the input terminals of an "and" network 286, and the lead 250 from the binary counter 242 is also connected to an input terminal of this "and" network. The output terminal of the "and" network 286 is connected to the right input terminal of the flip-flop 284 and to the left input terminal of a flip-flop 288. The left output terminal of the flip-flop 288 is connected to an input terminal of an "and" network 290, and the lead 250 from the binary counter 242 is also connected to an input terminal of this "and" network.

The output terminal of the "and" network 290 is connected to the left input terminal of a flip-flop 292, and to the right input terminal of the flip-flop 288. The left output terminal of the flip-flop 292 is conneced to an input terminal of an "and" network 294, and the lead 250 from the binary counter 242 is connected to a second input terminal of this "and" network.

The output terminal of the "and" network 294 is connected to the right input terminal of the flip-flop 292 and to the left input terminal of a flip-flop 296. The left output terminal of the flip-flop 296 is connected to an input terminal of an "and" network 298, and the lead 250 from the binary counter 242 is also connected to this "and" network.

The output terminal of the "and" network 298 is connected to the right input terminal of the flip-flop 296 and to the left input terminal of a flip-flop 300. The left output terminal of the flip-flop 300 is connected to an input terminal of an "and" network 302, and the lead 250 is also connected to this "and" network. The output terminal of the "and" network 302 is connected to the right input terminal of the flip-flop 300.

The left output terminal of the flip-flop 260 is connected to the control grid of a triode 304. The cathode of the triode is grounded, and its control grid is connected to a resistor 306. The resistor 306 is connected to the negative terminal of a direct voltage source 308, and the anode is connected to one terminal of the energizing winding of the solenoid valve 140 of FIGURE 1. The other terminal of this energizing winding is connected to the positive terminal of the direct voltage source.

The left output terminal of the flip-flop 278 is connected to the control grid of a triode 310, this control grid being connected to a resistor 312 which in turn connects to the negative terminal of the direct voltage source 308. The cathode of the triode 310 is grounded, and its anode is connected to one terminal of the energizing winding of the solenoid valve 138 of FIGURE 1. The other terminal of this winding is connected to the positive terminal of the direct voltage source 308.

The left output terminal of the flip-flop 300 is connected to the control grid of a triode 314, this control grid being connected to a resistor 316. The resistor 316 is connected back to the negative terminal of the direct voltage source 308, and the cathode of the triode, like the cathode of triode 310, is grounded. The energizing winding of the solenoid valve 136 is interposed between the anode of the triode 314 and the positive terminal of the direct voltage source 308.

It will be understood that similar connections may be provided for the remaining solenoid valves of FIGURE 1, so that the cards may be directed to each of the channels 14, 16, 18, 20, 22, 24, 26, 28, 30 and 32 depending upon the decimal equivalent of its binary number at the selected position.

To place the equipment of FIGURE 1 into operation, the feed wheel 60 is activated so that it rotates and feeds cards in succession to the channel 12. The pressurized fluid is introduced from its source into the chamber 36 of FIGURE 2 through the line 40 so that all the channels may be activated for transporting the cards. The cards are successively transported by the channel 12 past the transducing means 170. This causes the individual transducer heads 170a, 170b, 170c and 170d to generate pulses. These pulses initiate certain control effects which will be now described.

As the cards 200 pass the transducer heads 170a, 170b, 170c and 170d, the rows of data on the cards are processed by the transducer heads. The head 170d, as described above, reads the clock pulses recorded on the lower row of the cards, and these clock pulses are amplified by the amplifier 208 and introduced to the binary counter 242. In the described manner, the compare network 248 generates a pulse when the selected position on each card is being processed. Also, a pulse is developed by the binary counter on the lead 250 at the end of processing of each individual card.

As the cards pass the transducer heads 170a, 170b and 170c, the amplifiers 202, 204 and 206 produce pulses corresponding to the multi-digit binary number recorded at each position of the card. These pulses are used to trigger flip-flops in the translator 234 so that the flip-flops may assume operational states corresponding to the binary number of the processed position. The translator then responds to the position of the flip-flops to produce at the one of its output terminals a pulse which corresponds to the decimal equivalent of the states of the flip-flops for any particular position of the card being processed. These pulses are introduced to the "and" networks 236, 238 and 240. However, these "and" networks are conditioned for translation by the compare network 248 only at the selected position of the card being processed. Therefore, one of the flip-flops 252, 266 and 284 is triggered to its true state at the particular position of the card being processed as determined by the particular decimal equivalent represented by the binary data at that position.

Assume that the first card to be processed has binary data at its selected position which represents the decimal equivalent "1." Then, when the first card is processed, the flip-flop 252 will be triggered to a true state by the pulse appearing at the number 1 output terminal of the translator 234. The triggering of the flip-flop 252 to a true state conditions the "and" network 254 for translation. The "and" network 254 subsequently translates a pulse to the left input terminal of the flip-flop 256 at the completion of scanning of the first card, and a pulse appears on the lead 250. The output pulse from the "and" network 254 also returns the flip-flop 252 to a false state so that it may be prepared to respond to the next card being processed, should that card also have a decimal "1" recorded at its selected position.

The triggering of the flip-flop 256 to a true state conditions the "and" network 258 for translation. However, no pulse is translated by the "and" network 258 until the next succeeding card is processed by the transducer heads 170a, 170b, 170c and 170d, and only after such processing has been completed so that a second pulse appears on the lead 250. This gives the first card time to be moved up the common channel 12 towards the first gate 80 and toward the junction of the channel 14.

The resulting output pulse from the "and" network 258 returns the flip-flop 256 to its false state to prepare it for the next card, and this output pulse also triggers the flip-flop 260 to a true state.

The triggering of the flip-flop 260 to a true state causes the triode 304 to become conductive so that an energizing current flows through the energizing winding of the solenoid valve 140. The solenoid valve 140 therefore introduces pressurized fluid to the pneumatic gate member 80, and this occurs as the card reaches the junction between the channel 12 and the channel 14. The resulting pressurized streams from the gate 80 cause the card to move through the channel 14. This is the shortest route to the output station 150, this being desired because the first card designated a "1" at its selected position should arrive first at the output station.

It should be pointed out that the equipment and system can be arranged and timed so that all the cards transported to the output station 150 over the first path 14 will arrive at that station before any of the other cards, even though the last card in the station 60 was transported over that path. Likewise, all the cards transported through the path 16 will arrive after the cards transported by the path 14 but before any of the others, and so on. This provides that all of the cards in the input station 150 representing a binary "1" at the selected position appear first at the output station 150, all the cards representing a a decimal "2" at the selected position will then be fed in succession to the output station, and so on. It should also be appreciated that the different paths can have lengths which cause a partial sorting to be accomplished in each pass. By providing paths of such length, it may be necessary to provide a sorting operation through a plurality of passes before a complete sorting is obtained.

After the transfer of the first card to the path 14, and at the completion of the processing of the second following card, the "and" network 262 passes a pulse to the right input terminal of the flip-flop 260 to return that flip-flop to a false state and thereby terminate the conduction of the triode 304 to de-activate the gate 80.

Assume now that the second card to be processed represents the decimal equivalent "2" at its selected position so that the terminal number 2 of the translator 234 develops an output pulse. This causes the "and" notwork 238 to be conditioned for translation so that the flip-flop 266 is triggered to a true state for the second card.

The flip-flop 266 now places the "and" network 268 in condition for translation, and at the completion of processing of the second card, the resulting pulse on the lead 250 is passed through the "and" network 268 to trigger the flip-flop 270 to its true state and to return the flip-flop 266 to a false state. In a manner similar to that described above, the pulse on the lead 250 from the third card causes the flip-flop 274 to be triggered to a true state and the flip-flop 270 to be returned to a false state. The triggering of the flip-flop 278 to a true state causes the triode 310 to become conductive so that the gate 82 is activated. This activation of the gate 82 occurs at the precise time that the second card arrives at that position this second card having passed the de-activated gate 80 and proceeded on the path 12 up to the junction of the path 16. The resulting activation of the gate 82 causes the second card to be transported by the path 16, which is desired.

After the second card has been safely transferred to the path 16, the third card on the completion of its processing develops a pulse on the lead 250 to return the flip-flop 278 to its false state so as to de-activate the gate 82.

Assuming now that the third card to be processed represents a decimal equivalent of "3" at its selected position. In like manner, this card causes the flip-flop 284 to be triggered to a true state. Upon the completion of the processing of this third card, the flip-flop 288 is triggered to a true state and the flip-flop 284 is returned to a false state. Then, the completion of processing of the next succeeding or fourth card causes the flip-flop 292 to be triggered to a true state and the flip-flop 288 to be returned to a false state. The completion of processing of the fifth card causes the flip-flop 296 to be triggered to a true state and the flip-flop 292 to be returned to a false state. Finally, the completion of processing of the sixth card causes the flip-flop 300 to be triggered to a true state and the flip-flop 296 to be returned to a false state.

The triggering of the flip-flop 300 to a true state causes the triode 314 to become conductive to activate the gate 84. This activation of the gate 84 occurs at the precise moment that the third card arrives at the junction of the path 18 with the common path 12 so that the third card is directed into the path 18. This is desired because the third card represents a decimal "3" at its selected position.

The termination of processing of the next succeeding or seventh card causes the "and" network 302 to pass a pulse to the right input terminal of the flip-flop 300 to terminate the activation of the gate 84.

The control circuit of FIGURE 6, therefore, permits the different gates to be activated at the appropriate times so that cards carrying a decimal equivalent corresponding to the channel controlled by the different gates may be switched into the corresponding channel. The control circuitry of FIGURE 6 permits a continuous feed of cards from the input station to the channel 12, with each card following the other, and with the activation of the gates being timed by the processing of the cards so that each card has time to reach its particular gate before that gate is activated, and so that the activated gate may be de-activated in time to let the next card pass to its particular gate.

Therefore, by providing that each of the different paths between the input station 50 and the output station 150 require a different time interval to transport the cards between these stations, it is possible in the manner described above to provide a decimal sort of all the cards in the input station with respect to the data at a selected position on those cards. It should be appreciated that a decimal sorting operation is disclosed only by way of example and that operations in other numerical codes such as binary, binary-coded decimal and alphanumeric may also be performed without departing from the spirit of the invention.

The apparatus of FIGURE 7 includes a transport medium 400 which is illustrated as being in the form of a cylinder. The input station 50 in the latter embodiment is disposed at the lower left hand corner of the cylinder, and the output station 150 is disposed at the upper right hand corner.

The cylindrical transport medium 400 is shown as including a common path 402 which extends upwardly on the periphery of the cylinder and past the transducing means 170. After the transducing means is passed, the common path 402 splits into a pair of paths 404 and 406. Each of these latter paths is helical in form and spirals up the periphery of the cylinder 400 to the top of the cylinder. The two paths 404 and 406 join into a common path 408 at the top of the cylinder, and this common path terminates at the entrance to the output station 150. The path 404 is relatively short and reaches the common path 408 after a relatively few encirclements of the cylinder. The path 406, on the other hand, is relatively long and circles the cylinder a large number of times with respect to the path 404 before it joins the common path 408. Assuming that the speeds of transport are the same, therefore, cards transported along the path 406 will take a relatively long time to reach the common path 408 as compared with cards transported around the path 404.

The cylindrical transport medium 400 has an internal chamber such as the chamber 36 of the transport medium of FIGURE 1. This internal chamber is coupled to an appropriate source of pressurized fluid, such as air, and it introduces the fluid into the channels 404 and 406 through a plurality of angled orifices 14 in each of the channels. These angled orifices are also situated in the common channels 402 and 408. The pressurized streams of fluid emerging from the orifices 410 are in a direction to direct the cards around the respective channels, and to create a Bernoulli effect so that the cards are firmly supported on the guiding surface of the transport medium 400 as they are so directed.

A gate member 412 is mounted on the transport medium 400 and is directed across the channel 404 at the junction of this channel and the channel 406 with the common channel 410. This gate member 412 may be similar in its construction to the gate 96 described in FIGURE 5. Pressurized fluid is supplied to the gate member 412 through a line 414 which is coupled to a source of pressurized fluid.

A solenoid valve 416 is interposed in the line. When this solenoid valve is energized, the gate 412 is activated so that a barrier is set up across the path 404 and cards from the common channel 402 are directed to the channel 406. A second gate member 418 is positioned in the transport medium 400 adjacent the junction of the three channels 402, 404 and 406. This latter gate is directed across the channel 406 and when it is activated, the resulting streams of pressurized fluid cause the cards to be directed along the channel 404.

A line 420 couples the gate 418 to the source of pressurized fluid, and a solenoid valve 422 is interposed in this line. Therefore, when the solenoid valve 422 is energized, the gate 418 is activated to direct cards along the channel 404. Conversely, when the solenoid valve 416 is energized the gate 412 is activated to direct the cards along the channel 406. As noted above, the channel 404 represents the short fast route to the output station 150, and the channel 406 represents the long slow route to the output station.

The transport medium of FIGURE 7 likewise serves to transport the cards to the output station in an order different from that in which they were supplied to the transport medium from the input station. In the control system to be described, the cards transported by the transport medium 400 of FIGURE 7 have their data at the selected position compared with one another, so that when the data on any particular card is greater than that on the preceding card, the compared card is directed to one path, and when the data on any card is less than that on the preceding card, the latter card is directed to the other path. In this manner, and after an appropriate number of passes have been made, the cards may be sorted into a desired sequence or progression with respect to the data at the particular position on the card as selected by the selector 244 of FIGURE 9.

For example, and as shown in FIGURE 8, assume that a group of cards designated A, B, C, D, E, F, G, H, I and J are successively fed from the input station to the common track or channel 402. Also, assume that the decimal equivalent of the information at the selected position of each of these cards is as follows: $A=1$, $B=7$, $C=4$, $D=3$, $E=2$, $F=9$, $G=0$, $H=5$, $I=8$, and $J=6$. After an appropriate number of passes, it is desired that the cards appear in the output station 150 in the following order: $A=1$, $E=2$, $D=3$, $C=4$, $H=5$, $J=6$, $D=7$, $I=8$, $F=9$ and $G=0$.

To achieve this sorted condition, each card is compared with its succeeding card. If the numerical information on the following card is greater than that on the preceding card, it is directed to the slow track 406. Similarly, if the numerical information on the following card is less than that on the preceding card, it is directed to the fast track 404.

Therefore, and as shown in FIGURE 8, the compare register is first set to zero and the first card $A=1$ is greater than zero. Therefore, the first card is placed on the slow track. The second card $B=7$ is then compared with the first card $A=1$. Because B is greater than A, it also is placed on the slow track 406. The third card $C=4$ is then compared with the second card $B=7$. Because C is less than B, the C card is placed on the faster track 404. In like manner, the D, E and J cards are placed on the fast track 404 and the F, G, H and I cards are placed on the slow track 406. The speeds and lengths of the tracks are so arranged that the cards arrive at the common upper track 408 in the order designated by the lower row in FIGURE 8. That is, the C card arrives between the A and B cards, the D card arrives after the B card, and the J card arrives between the H and I cards and so on.

Therefore, the cards fed into the output station 150 at the end of the first track are in the order $A=1$, $C=4$, $B=7$, $D=3$, $E=2$, $F=9$, $G=0$, $H=5$, $J=6$, and $I=8$. With each succeeding pass of the cards, the low numbers will tend to drift to the right of the lower row progression in FIGURE 8 on the upper common track and the high numbers will tend to drift to the left. After an appropriate number of passes, all the cards will be sorted with respect to their decimal equivalents at the selected position. For example, in the next pass the cards will appear at the common track 410 in the order $A=1$, $C=4$, $D=3$, $B=7$, $E=2$, $F=9$, $H=5$, $G=0$, $J=6$ and $I=8$. At the next pass, the cards will appear at the common upper track in the following order: $A=1$, $D=3$, $C=4$, $E=2$, $B=7$, $H=5$, $F=9$, $J=6$, $G=0$, and $I=8$. For the next pass, the cards will appear at the common track 408 in the following order: $A=1$, $D=3$, $E=2$, $C=4$, $H=5$, $B=7$, $J=6$, $F=9$, $I=8$ and $G=0$. For the next pass, the cards will arrive on the common track 408 in the following order: $A=1$, $E=2$, $D=3$, $C=4$, $H=5$, $J=6$, $B=7$, $I=8$, $F=9$, and $G=0$. Therefore, after a number of passes, the cards are fed to the output station in a fully sorted condition. It will be appreciated that any number of cards may be sorted through any progression by continuing the number of passes.

A suitable control system for providing the control of the apparatus of FIGURE 7 is shown in FIGURE 9. In the control system of FIGURE 9, the amplifiers 202, 204 and 206 are connected respectively to the left input terminals of a group of flip-flops 420, 422 and 424, and to the input terminals of respective inverters 426, 428 and 430. The output terminals of the inverters are connected to the input terminals of respective ones of the flip-flops 420, 422 and 424. The connections are such that each flip-flop is triggered to a true state in response to a binary "1" on the card 200 as read by the transducer heads 170a, 170b and 170c, and the flip-flops are triggered to a false state for each binary zero.

As in the preceding embodiment, for a practical construction more data rows would be used on the card 200 and more amplifiers, read heads and flip-flops would be provided. Three such rows with three associated flip-flops are shown merely to simplify the description. It will be appreciated, that as each card is scanned or processed by the transducer heads from position to position, the flip-flops 420, 422 and 424 are set to operational states corresponding to the multi-digit binary numbers represented at those positions.

The left and right output terminals are connected respectively to a pair of "and" networks 432 and 434 and to a pair of "and" networks 436 and 438. The left and right output terminals of the flip-flop 422 are connected respectively to a pair of "and" networks 440 and 442 and to a pair of "and" networks 444 and 446. Likewise, the left and right output terminals of the flip-flop 424 are connected to a pair of "and" networks 448 and 450, and to a pair of "and" networks 452 and 454. The compare network 248 which, as in the previous embodiment, passes a pulse when the selected position on each card is reached, has its output terminal connected to each of the "and" networks 432, 434, 436, 438, 440, 442, 444, 446, 448, 450, 452 and 454.

A flip-flop 456 is provided, and the left output terminal of this flip-flop is connected to each of the "and" networks 432, 434, 440, 442, 448, 450, whereas the right output terminal of the flip-flop 456 is connected to each of the "and" networks 436, 438, 444, 446, 452, and 454.

The lead 250 from the binary counter, and on which a pulse appears at the end of processing of each card as described above, is connected to each of a pair of "and" networks 458 and 460. The right output terminal of the flip-flop 456 is connected to an input terminal of the "and" network 458 and the left output terminal of the flip-flop 456 is connected to an input terminal of the "and" network 460. The output terminal of the "and" network 458 connects with the left input terminal of the flip-flop 456, and the output terminal of the "and" network 460 connects with an "or" network 462 which is connected to the right input terminal of the flip-flop 456.

Networks such as the "or" network 460 are also well known to the electronic digital computer art. These networks function to pass to a common output terminal any individual input signal applied to any one of its input terminals.

The "and" network 432 is connected to the left input terminal of a flip-flop 464, the "and" network 440 is connected to the left input terminal of a flip-flop 466, and the "and" network 448 is connected to the left input terminal of a flip-flop 468. The "and" network 434 is connected to an "or" network 470 which, in turn, is connected to the right input terminal of the flip-flop 464. The "and" network 442 is connected to an "or" network 472 which is connected to the right input terminal of the flip-flop 466, and the "and" network 450 is connected to an "or" network 474 which is connected to the right input terminal of the flip-flop 468.

The "and" networks 436 and 438 are respectively connected to the left and right input terminals of a flip-flop 476. The "and" networks 444 and 446 are respectively connected to the left and right input terminals of a flip-flop 478. Finally, the "and" networks 452 and 454 are respectively connected to the left and right input terminals of a flip-flop 480.

The output terminals of the flip-flops 464, 466 and 468 are connected to one set of input terminals of a comparator 482, and the output terminals of the flip-flops 476, 478 and 480 are connected to a second set of input terminals of the comparator. The comparator 482 develops an output signal on a lead 484 when the decimal equivalent of the signal introduced to the first set of input terminals is less than the decimal equivalent of the number represented by the signals introduced to its second set of input terminals. In like manner, the comparator 482 develops an output pulse on the lead 486 when the number represented by the signals introduced to its first set of input terminals exceeds the number represented by the signals introduced to its second set of input terminals.

The comparator 482 is shown in block form for purposes of simplicity. Actually, this network is formed by a plurality of "and" and "or" networks interrelated in a logical pattern. The comparator may be constructed and operated in a manner similar to that described in Luhn Patent 2,364,540; Kouzmine Patent 2,501,821; Dickinson Patent 2,484,081; Edwards Patent 2,615,127; Woolard Patent 2,641,696; Bensky Patent 2,679,638; Haselton Patent 2,155,825; Spielberg Patent 2,674,727; or Hamilton Patent 2,580,768.

The operation of the comparator 482 for the introduction of a signal to the lead 486 may be expressed as:

$$X = i_3 j_3' + (i_3 j_3 + i_3' j_3')[i_2 j_2' + (i_2 j_2 + i_2' j_2')(i_1 j_1')]$$

where:

$j_1$ = a relatively high voltage at the left output terminal of the flip-flop 464;

$j_1'$ = a relatively high voltage at the right output terminal of the flip-flop 464;

$j_2$ = a relatively high voltage at the left output terminal of the flip-flop 466;

$j_2'$ = a relatively high voltage at the right output terminal of the flip-flop 466;

$j_3$ = a relatively high voltage at the left output terminal of the flip-flop 468;

$j_3'$ = a relatively high voltage at the right output terminal of the flip-flop 468;

$i_1$, $i_2$ and $i_3$ = relatively high voltages on the left output terminals of the flip-flops 476, 478 and 480, respectively;

$i_1'$, $i_2'$ and $i_3'$ = relatively high voltages at the right output terminals of the flip-flops 476, 478 and 480, respectively; and $X$ = a signal on the output lead 486 to indicate that the number stored in the flip-flops 464, 466 and 468 is greater than the number stored in the flip-flops 476, 478 and 480.

The introduction of a signal from the comparator 482 to the lead 484, on the other hand, may be logically expressed as:

$$Y = j_3 i_3' + (j_3 i_3 + j_3' i_3')[j_2 i_2' + (i_2 j_2 + i_2' j_2') j_1 i_1']$$

where:

$Y$ = a signal on the lead 484 to indicate that the number stored in the flip-flops 476, 478 and 480 is greater than the number stored in the flip-flops 464, 466 and 468, and where the other terms have been previously defined.

The lead 484 from the comparator 482 is connected to an "and" network 485 and to an "and" network 487. The lead 486 from the comparator, on the other hand, is connected to an "and" network 489 and to an "and" network 491. The right output terminal of the flip-flop 456 is connected to the "and" networks 485 and 491, and the left output terminal of that flip-flop is connected to the "and" networks 487 and 489. The "and" networks 485 and 489 are connected to an "or" network 493, and the "and" networks 487 and 491 are connected to an "or" network 495. The "or" network 493 is connected to the left input terminal of a flip-flop 488, and the "or" network 495 is connected to the right input terminal of that flip-flop.

The left output terminal of the flip-flop 488 is connected to the control grid of a triode 490, and the right output terminal of the flip-flop is connected to the control grid of a triode 492. Both the cathodes of these triodes are grounded, and a pair of resistors 494 and 496 are respectively connected between the control grids and the negative terminal of the source 308 of direct voltage.

The energizing winding of the solenoid valve 416 associated with the gate 412 is interposed in the anode circuit of the triode circuit 490, and the energizing winding of the solenoid valve 422 associated with the gate 418 is interposed in the anode circuit of the triode 492. Both these anode circuits are connected to the positive terminal of the source 308.

The positive terminal of the source 308 is also connected to a starting push-button switch 500, and the switch is connected to a capacitor 502. The capacitor 502 is connected to a differentiator 504, and the output signal from the differentiator is introduced to each of the "or" networks 470, 472, 474 and 462.

Prior to starting the feed of cards from the input station to the track or channel 402, the start switch 500 is depressed and released. This introduces a charge to the capacitor 502 which, in turn, causes the differentiator 504 to produce a sharp output pulse. The output pulse from the differentiator 504 triggers each of the flip-flops 464, 466 and 468 to a false state so that the top register formed by these flip-flops is set to zero. The output pulse from the differentiator 504 also sets the flip-flop 456 to a false state to condition the bank of "and" networks 436, 438, 444, 446, 452 and 454 for conduction.

Now the feed wheel 60 is rotated and the cards are successively released from the input station 50. As the first card is processed by the transducer heads 170a, 170b, 170c and 170d, the resulting output pulses from the amplifiers 202, 204, and 206 cause the flip-flops 420, 422 and 424 to assume operational states corresponding to the multi-digit binary numbers at each position on the card as each such position is processed. When the selected position is reached, the compare network 248 generates an output pulse and causes the "and" networks 436, 438, 444, 446, 452 and 454, which were conditioned for conduction by the flip-flop 456, to pass the operational states of the flip-flops 420, 422 and 424 to the lower register formed by the flip-flops 476, 478 and 480. The flip-flops 476, 478 and 480 therefore assume operational states corresponding to the binary number at the selected position of the card being processed.

In the example under consideration, the decimal equivalent of this binary number is "1" which is greater than zero so that the comparator 482 generates a pulse on its upper lead 484. This pulse is translated through the "and" network 485, which is conditioned for conduction by the present operational state of the flip-flop 456, so that the flip-flop 488 is triggered to a true state. This activates the gate 412 and de-activates the gate 418, because the triode 490 is rendered conductive and the triode 492 is cut off. Therefore, the first card is transferred to the slow track 406, which as explained in conjunction with FIGURE 8 is the desired condition.

At the end of the processing of the first card, the binary counter 214 develops a pulse on the lead 250, and this pulse is passed through the "and" network 458 (which is conditioned for conduction by the present operational state of the flip-flop 456) to the left input terminal of the flip-flop 456. This causes the flip-flop 456 to be triggered to a true state. This latter state of the flip-flop 456 conditions the "and" networks 432, 434, 440, 442, 448 and 450, rather than the "and" networks 436, 438, 444, 446, 452 and 454 for conduction. Therefore, the binary number at the selected position of the second card to be processed is read into the flip-flops 464, 466 and 468, and the binary number at the selected position of the preceding card is retained in the flip-flops 476, 478, 480.

In the example discussed in conjunction with FIGURE 8, it was assumed that the second card was $D=7$, which was greater than the first card which was $A=1$. Therefore, the comparator 482 develops a pulse on the output lead 486. However, the present state of the flip-flop 456 now conditions the "and" network 489 for conduction so that the pulse on this lower lead is introduced to the left input terminal of the flip-flop 488. The flip-flop 488 therefore remains in the same state as previously, so that the second card $D=7$ is also transferred to the slow track 406.

At the completion of the processing of the second card, the pulse developed on the lead 250 by the binary counter is now passed by the "and" network 460 to return the flip-flop 456 to its false state. Therefore, the lower "and" networks 436, 438, 444, 446, 452 and 454 are again conditioned for conduction so that the binary number at the selected position of the third card to be processed is transferred from the flip-flops 420, 422 and 424 into the flip-flops 476, 478 and 480.

In the illustrated example of FIGURE 8, this third card $C=4$ is less than the second card $D=7$. Therefore, the comparator 482 develops an output pulse on its lead 486. The "and" network 491 is now conditioned for conduction, so that this pulse triggers the flip-flop 488 to a true state. This reverses the activation of the gates 412 and 418 so that the third card is passed to the fast track 404, which is the desired operation.

The above operations continue from card to card, with the state of the flip-flop 456 being changed at the completion of processing of each card. As the flip-flop 456 changes its state, the selected number from the succeeding card is fed to a different register from that of the preceding card for comparison with the number of the preceding card in the comparator 482. As described above, the passes are repeated between the input station and the output station until the cards are completely sorted.

The embodiments of the invention described above, and the associated logic control systems, are merely for purposes of explaining examples of the present invention. The invention, however, comprises a general concept in the provision of apparatus and systems which include multi-path transport media in which the cards transported from a first point, such as an input station, arrive at a second point, such as an output station, in an order different from that in which they were received by the transport media. It will be appreciated that the term "cards" as used in the specification and in the claims is intended to include any type of discrete elements which are capable of storing information for subsequent reproduction of such information.

It should be appreciated that the individual paths branching from the common paths at the input and output ends of the transport member do not necessarily need different lengths in order to provide a rearrangement of the cards during their movement. For example, the individual paths may have identical lengths but may have characteristics to provide a movement of the cards at different constant speeds along the various individual paths. These differences in characteristics for each individual path may be obtained by adjusting the intensity of the Bernoulli effect produced along each path. Such variations in the intensity of the Bernoulli effect may be obtained by way of illustration by adjusting the diameter of the holes in the transport member for directing the pressurized fluid against the cards or by directing the pitch of these holes.

We claim:

1. In combination for use with a plurality of information storage cards: input means constructed to hold information storage cards in the plurality in stacked relationship and to provide a transfer of such cards from the input means, a single receiving means constructed to hold information storage cards in the plurality in stacked relationship, transport means disposed relative to the input means and the receiving means to provide a movement to the receiving means of the cards transferred from the input means, the transport means being provided with a plurality of different paths and constructed to provide a controlled movement of the cards from the input means to the receiving means along the different paths in the plurality to deliver the cards at the receiving means in an order different from the transfer of the cards in the input means, and means responsive to particular information on the cards in the transport means for controlling the path of movement of each individual card on the transport means in accordance with such particular information.

2. In combination for use with a plurality of information storage cards: means including at least one input card holder constructed to hold information storage cards in the plurality in stacked relationship and to provide a transfer of such cards from the input card holder, means including a single output card holder constructed to hold information storage cards in the plurality in stacked relationship and to provide a transfer of cards to the output card holder, means including a multipath transport member disposed relative to the input card holder and to the output card holder to obtain a movement to the output card holder of the cards transferred from the input card holder and constructed to provide a controlled movement of the cards along the different paths to the output card holder for a delivery of the cards at the output card holder in an order different from the transfer of the cards from the input card holder and to obtain such different order of the cards at the output card holder in accordance with the movements of the cards on the different paths of the transport means, and control means responsive to particular information on the cards on the transport means for selectively directing the cards on the transport means to different ones of the paths in accordance with the particular information processed on the cards.

3. In combination for use with a plurality of information storage cards: input means constructed to hold information storage cards in the plurality in stacked relationship and to obtain a transfer of such cards from the input means, an individual receiving means constructed to hold information storage cards in the plurality in stacked relationship and to obtain a transfer of such cards to the receiving means, transport means disposed relative to the input means and the output means to provide a transfer to the output means of cards transferred from the input means, the transport means being provided with a plurality of paths to provide a controlled movement of the cards from the input means to the receiving means along the different paths in the plurality, each of the paths in the plurality on the transport means being provided with characteristics requiring a different time interval for the transport means to obtain a movement of the cards from the input means to the receiving means than the time for the transport of the cards along the other paths in the plurality from the input means to the output means, and control means responsive to particular information on the cards on the transport means for directing such cards to the different paths in the plurality on the transport means in accordance with such particular information.

4. In combination for use with a plurality of information storage cards: means including at least one input card holder constructed to hold information storage cards in the plurality and constructed to obtain a transfer of such cards from the holder, means including an individual card holder output card holder constructed to hold information storage cards in the plurality and to obtain a transfer of such cards to the output card holder, multipath transport means disposed relative to the input card holder and the output card holder for receiving cards from the input card holder and for providing a movement of such cards to the output card holder along the different paths of the transport means, each of the paths of the transport means being constructed to provide a different time interval for the movement of cards from the input card holder to the output card holder, and control means disposed relative to the transport means and responsive to particular information on the transported cards for selectively directing the cards on the transport means to different ones of the paths on the transport means in accordance with the particular information on the cards.

5. In combination for use with a plurality of information storage cards: input means constructed to hold information storage cards in the plurality in stacked relationship and to obtain a transfer of such cards from the input means, a single receiving means constructed to hold information storage cards in the plurality in stacked relationship and to obtain a transfer of such cards to the receiving means, transport means disposed relative to the input means and the output means to receive the cards transferred from the input means and to obtain a movement of such cards to the output means, the transport means being provided with a guiding surface defining a plurality of different paths and being constructed to provide a controlled movement of the cards from the input means to the receiving means along the different paths in the plurality, each of the paths in the plurality being provided with characteristics to obtain a movement of the cards in a different length of time along that path than the time for the movement of the cards along the other paths in the plurality, fluid-emitting means disposed in coupled relationship to the guiding surface of the transport means for creating a force on the guiding surface to move the cards along the different paths on the guiding surface, and control means responsive to particular information on the cards during the movement of the cards along the guiding surface for operating upon the fluid-emitting means to obtain a selective movement of such cards along the different paths in the plurality on the guiding surface in accordance with the particular information on such cards.

6. In combination for use with a plurality of information storage cards, input means constructed to hold information storage cards in the plurality in stacked relationship and to obtain a transfer of such cards from the input means, receiving means constructed to hold information storage cards in the plurality in stacked relationship, transport means disposed relative to the input means and the receiving means for providing a movement to the receiving means of the cards transferred from the input means, the transport means including a guiding surface defining a plurality of different paths along which cards are moved from the input means to the receiving means, means coupled to the transport means for directing streams of pressurized fluid along the different paths on the guiding surface to create a force for the movement of cards along the different paths on the guiding surface, and control means responsive to particular information on the cards transferred to the transport means for selectively directing the cards to different paths in the plurality on the guiding surface of the transport means in accordance with the particular information on the cards.

7. In combination for use with a plurality of information storage cards: input means constructed to hold information storage cards in the plurality and to obtain a transfer of such cards from the input means, an individual receiving means constructed to hold information storage cards in the plurality in stacked relationship and to obtain a transfer of such cards to the receiving means, transport means disposed relative to the input means and the receiving means for providing a movement to the receiving means of the cards transferred from the input means, the transport means including a guiding surface defining a plurality of different paths on which the cards are moved from the input means to the receiving means, each of the different paths in the plurality being provided with characteristics to obtain a movement of the cards along the path in a different length of time than the time for the movement of the cards along the other paths in the plurality, means disposed relative to the transport means for directing a pressurized fluid through the guiding surface of the transport means to obtain a movement of the cards along the different paths on the guiding surface, gating means disposed relative to the cards on the transport means for selectively directing the cards to different paths in the plurality on the guiding surface, transducing means disposed relative to the cards on the transport means for sensing particular information on such cards, and a control system responsive to the particular information sensed by the transducing means for operating upon the gating means to selectively direct the cards to different paths in the plurality on the guiding surface in accordance with such sensed information.

8. In combination for use with a plurality of information storage cards: means including an input card holder constructed to hold information storage cards in the plurality in a stacked condition and to obtain a controlled transfer of cards from the card holder, means including a receiving card holder constructed to hold information storage cards in the plurality in a stacked condition and to obtain a controlled transfer of cards to the receiving card holder, transport means disposed relative to the input card holder and including a guiding surface defining a plurality of paths on which the cards are to be moved from the input card holder to the receiving card holder, means for directing streams of pressurized fluid along the different paths in the plurality on the guiding surface of the transport means to create a force for moving the cards along the different paths on the guiding surface, gating means disposed relative to the cards on the transport means for selectively directing the cards to different ones of the paths in the plurality on the guiding surface in accordance with the activation of the gating means, transducing means disposed relative to the cards on the transport means for sensing particular information on the transported information storage cards, and a control system coupled to the transducing means for selectively activating the gating means in accordance with the particular information sensed by the transducing means on such card.

9. Apparatus for sorting a plurality of information storage cards in accordance with information recorded on the cards, said apparatus including: means including an input card holder constructed to hold information storage cards in the plurality in a stacked condition and to obtain a transfer of cards from the card holder, means including an output card holder constructed to hold information storage cards in the plurality in a stacked condition and to obtain a transfer of cards to the output card holder, transport means disposed relative to the input card holder and the output card holder for providing a controlled movement of the cards from the input card holder to the output card holder, the transport means being provided with a plurality of paths, each of the paths in the plurality on the transport means being constructed to require a different time interval to transport cards from the input card holder to the output card holder, gating means disposed relative to the cards on the transport means for selectively directing the cards to different ones of the paths of the transport means in accordance with the activation of the gating means, transducing means disposed relative to the cards on the transport means for sensing particular information on the information storage cards, and a control system coupled to the transducing means for selectively activating the gating means in accordance with the particular information sensed on the cards by the transducing means to selectviely direct the cards to different ones of the paths in the plurality on the transport means in accordance with such processed information.

10. Apparatus for sorting a plurality of information storage cards in accordance with information recorded on the cards, said apparatus including: means including an input card holder constructed to hold information storage cards in the plurality in a stacked condition and to obtain a transfer of cards from the input card holder, means including an output card holder constructed to hold information storage cards in the plurality in a stacked condition and to obtain a transfer of cards to the output card holder, stationary transport means provided with a plurality of paths and constructed to provide a movement of cards along the different paths in the plurality, each of the paths in the plurality on the transport means being disposed relative to the input and output card holders and being provided with characteristics to require a different time interval for the movement of cards from the input card holder to the output card holder than the time interval required for the movement of cards along the other paths in the plurality, pneumatic means coupled to the transport means for directing the cards along the different paths in the plurality on the stationary transport means, pneumatic gating means disposed relative to the cards on the transport means for selectively directing the cards to different ones of the paths in the plurality on the stationary transport means in accordance with the activation of the gating means, transducing means disposed relative to the cards on the transport means for sensing particular information on the transported information storage cards, and a control system coupled to the transducing means for selectively activating the pneumatic gating means in accordance with the particular information sensed on the transported cards by the transducing means to selectively direct the cards to different ones of the paths in the plurality on the transport means.

11. Apparatus for sorting a plurality of information storage cards in accordance with information recorded on the cards, said apparatus including: means including an input card holder constructed to hold information storage cards in the plurality in a stacked condition and to obtain a transfer of cards from the card holder, means including an output card holder constructed to hold information storage cards in the plurality in a stacked condition and to obtain a transfer of cards to the output card holder, stationary transport means disposed relative to the input card holder and the output card holder for providing a controlled movement of the cards from the input card holder to the output card holder and including a guiding surface having a plurality of paths over which the cards are moved from the input card holder to the output card holder, each of the paths in the plurality on the guiding surface being provided with characteristics to require a different time interval to obtain a movement of cards from the input card holder to the output card holder than the time interval required for the cards on the other paths in the plurality, means disposed relative to the transport means for directing air under pressure along the different paths in the plurality on the guiding surface to create a force for moving the cards along the different paths on the guiding surface, gating means disposed relative to the cards on the transport means for selectively directing the cards to different ones of the paths in the plurality on the guiding surface in accordance with the activation of the gating means, transducing means disposed relative to the cards on the transport means for sensing particular information on the transported information storage cards, and a control system coupled to the transducing means for selectively activating the gating means in accordance with the particular information sensed on the transported cards by the transducing means to selectively direct the cards to different ones of the paths in the plurality on the guiding surface.

12. Apparatus for sorting a plurality of information storage cards in accordance with information recorded on the cards, said apparatus including: means including an input card holder constructed to hold information storage cards in the plurality in a stacked condition and to obtain a transfer of cards from the card holder, means including an output card holder constructed to hold information storage cards in the plurality in a stacked condition and to obtain a transfer of cards to the output card holder, stationary transport means disposed relative to the input card holder and the output card holder for providing a controlled movement of the cards from the input card holder to the output card holder and including a guiding surface defining a plurality of paths over which the cards are moved from the input card holder to the output card holder, each of the paths in the plurality requiring a different time than the other paths in the plurality to obtain a movement of cards from the input card holder to the output card holder, means disposed relative to the transport means for directing air under pressure along the different paths in the plurality on the guiding surface to create a force for moving the cards along the different paths of the guiding surface, a plurality of gate means disposed relative to the transport means in respective association with the different paths in the plurality on the guiding surface for selectively directing the cards to different one of the paths in accordance with the activation of the gate means, transducing means disposed relative to the cards on the transport means for sensing particular information on the storage cards for the production in response to such information of control signals representing such particular information, and means responsive to the control signals for selectively activating the gate means in the plurality to direct the cards into the different paths in the plurality on the guiding surface in accordance with such control signals.

13. Apparatus for processing data on a plurality of information storage cards, said apparatus including: means including an input card holder constructed to hold information storage cards in the plurality in a stacked condition and to obtain a controlled transfer of cards from the input card holder, means including an output card holder constructed to hold information storage cards in the plurality in a stacked condition and to obtain a controlled transfer of cards to the output card holder, stationary transport means disposed relative to the input card holder and the output card holder for providing a controlled movement of cards from the input card holder to the output card holder and including a guiding surface provided with a plurality of paths over which the cards are moved from the input card holder to the output card holder, each of said paths being provided with characteristics to obtain a different time interval for the movement of the cards from the input card holder to the output card holder, means disposed relative to the transport means for directing air under pressure along the different paths in the plurality on the guiding surface to create a force for moving the cards along the different paths, a plurality of pneumatic gate members each disposed relative to the cards on the transport means in respective association with a different one of the paths in the plurality on the guiding surface for selectively directing the cards to such paths, transducing means disposed relative to the cards on the transport means for reading particular data on the transported information storage cards and for producing control signals in response to such data, and means responsive to the control signals for selectively activating the pneumatic members to direct each card into a particular path in the plurality on the guiding surface in accordance with such control signals.

14. Apparatus for processing data on a plurality of information storage cards, said apparatus including: means including an input card holder constructed to hold information storage cards in the plurality in a stacked condition and to obtain a transfer of such cards from the input card holder, means including an output card holder constructed to hold information storage cards in the plurality in a stacked condition and to obtain a transfer of such cards to the output card holder, stationary transport means disposed relative to the input card holder and the output card holder and constructed to provide a controlled movement of the cards from the input card holder to the output card holder and including a guiding surface defining at least two different paths for the movement of the cards from the input card holder to the output card holder, each of the paths being provided with characteristics to obtain a movement of the cards from the input card holder to the output card holder in a different time than that produced by the other path, means for directing air under pressure along each of the two paths on the guiding surface to create a force for moving the cards along the paths, gate means disposed relative to the cards on the transport means for selectively directing the cards along the two paths in accordance with the operation of the gate means, transducing means disposed relative to the information storage cards on the transport means for sensing particular data on such cards and for producing control signals in representation of such data, and a control system responsive to the control signals for comparing data represented by the control signals from successive cards to derive an actuating signal for controlling the operation of the gate means in directing the cards along the two paths in accordance with such data.

15. In apparatus for processing data on a plurality of information storage cards, the combination of: means including a first card holder constructed to hold information storage cards in the plurality in stacked relationship and to obtain a transfer of such cards from the card holder, means including a second card holder constructed to hold information storage cards in the plurality in stacked relationship and to obtain a transfer of such cards to the second card holder and disposed in spaced relationship to the first card holder, transport means having a plurality of paths of different lengths and extending from a first common path relative to the first card holder and terminating in a second common path relative to the second card holder for movement of the cards along the different paths to the second card holder in a different length of time for each path than that provided by the other paths in the plurality, means disposed relative to the cards on the transport means at the position of the first common path for sensing particular data on the transported cards, and means disposed relative to the cards on the transport means at the positions of junction between the different paths in the plurality and the first common path for directing each card along a particular path in the plurality to the second card holder in accordance with the particular data sensed on the cards.

16. In apparatus for processing data on a plurality of information storage cards, the combination of: means including a first card holder constructed to hold information storage cards in the plurality in stacked relationship and to obtain a transfer of cards from the first card holder, means including a second card holder constructed to hold information storage cards in the plurality in stacked relationship and to obtain a transfer of cards to the second card holder and disposed in spaced relationship to the first card holder, means including a transport member disposed relative to the first and second card holders to provide a transfer of cards between the transport member and the card holders and provided with first and second common paths respectively disposed relative to the first and second card holders to provide such a transfer of cards and provided with a plurality of individual paths terminating at opposite ends in the first and second common paths and constructed to provide a movement of the cards along the first common path to the different individual paths in the plurality and then to the second common path and constructed to provide a movement of the cards along each individual path in the plurality in a different length of time than that provided by the other paths in the plurality, a plurality of gate means disposed respectively relative to the transport means at positions near the junction between the first common path and the individual paths in the plurality and operative to provide a transfer of the cards from the first common path to the individual paths in accordance with the activation of the gate means, transducing means disposed relative to the cards on the transport means at a position near the first common path for sensing particular data on each transported card, and electrical circuitry coupled to the transducing means for activating particular gate means in the plurality in accordance with the particular data sensed by the transducing means on the transported cards to obtain a movement of the cards along the different individual paths in the plurality for a rearrangement of the cards upon their movement to the second card holder in accordance with the particular data on the cards.

17. In apparatus for processing data on a plurality of information storage cards, the combination of: means including a first card holder constructed to hold information storage cards in the plurality of stacked relationship and to obtain a transfer of cards from the card holder, means including a second card holder constructed to hold information storage cards in the plurality in stacked relationship and to obtain a transfer of cards to the second card holder and disposed in spaced relationship to the first card holder, transport means disposed relative to the first and second card holders and constructed to provide a movement of cards from the first card holder to the second card holder and provided with at least a pair of different paths between the first and second card holders, each of the paths in the pair being provided with characteristics to obtain the movement of cards from the first card holder to the second card holder in a different length of time than the movement of the cards along the other path from the first card holder to the second card holder, means including transducing means disposed relative to the cards on the transport means for sensing particular data on the transported cards, and comparator means responsive to the particular data sensed by the transducing means on successive pairs of cards for comparing such information on the cards to obtain a movement of the cards along particular paths in the pair in accordance with such comparison.

18. In appaartus for processing data on a plurality of information storage cards, the combination of: means including a first card holder constructed to hold information storage cards in the plurality in stacked relationship and to provide a transfer of the cards from the card holder, means including a second card holder constructed to hold information storage cards in the plurality in stacked relationship and to provide a transfer of cards to the second card holder and disposed in spaced relationship to the first card holder, means including a transport member disposed relative to the first and second card holders to obtain a transfer of cards from the first card holder to the second card holder and constructed to provide a movement of the cards and provided with a first common path in coupled relationship to the first card holder and a second common path in coupled relationship to the second card holder and provided with a pair of branches extending between the first and second common paths and having characteristics to obtain different times for the movement of the cards along each branch in comparison to the movement of the cards along the other branch, gate means disposed relative to the cards on the transport member at a position near the first common path for providing a transfer of cards between the first common path and particular ones of the first and second branches in accordance with the actuation of the gate means, transducing means disposed relative to the cards on the transport member at a position near the first common path for sensing particular data on the transported cards, means including a comparator coupled to the transducing means for comparing the particular data sensed by the transducing means from successive pairs of cards to provide control signals in accordance with such comparison, and electrical circuitry responsive to the control signals from the comparator to actuate the gate means for a movement of the cards along the different branches of the transport means.

References Cited in the file of this patent

UNITED STATES PATENTS

| | | |
|---|---|---|
| 1,103,293 | Whittier | Aug. 25, 1914 |
| 2,039,016 | McGuinness | Apr. 28, 1936 |
| 2,257,220 | Becker | Sept. 30, 1941 |
| 2,345,967 | Gent | Apr. 14, 1944 |
| 2,441,912 | Streich | May 18, 1948 |
| 2,527,394 | Browne | Oct. 24, 1950 |
| 2,538,972 | Magnani | Jan. 23, 1951 |
| 2,719,629 | Robinson | Oct. 4, 1955 |
| 2,786,938 | Coley | Mar. 26, 1957 |
| 2,805,898 | Willis | Sept. 10, 1957 |
| 2,816,218 | Rees | Dec. 10, 1957 |

FOREIGN PATENTS

| | | |
|---|---|---|
| 149,723 | Sweden | Apr. 19, 1955 |